May 14, 1968 R. J. STEVENS 3,382,982
STRAINERS FOR FLUIDS
Filed Feb. 9, 1966 2 Sheets-Sheet 1
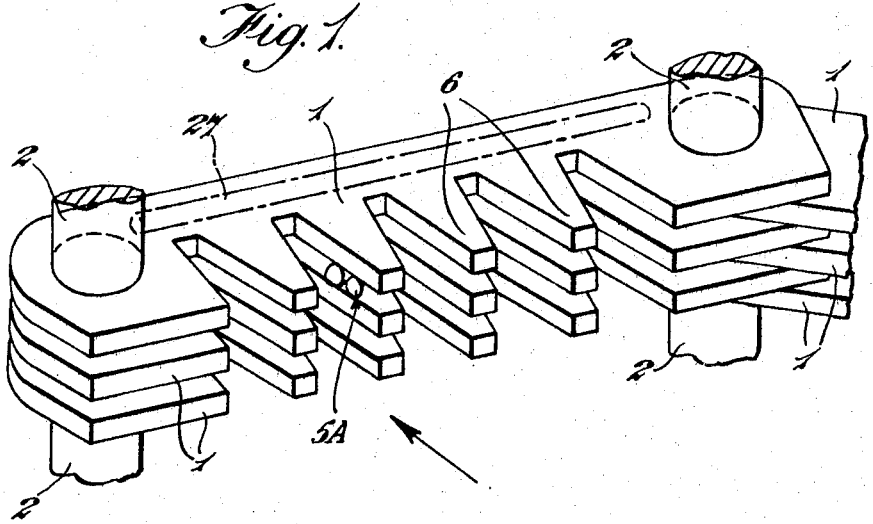
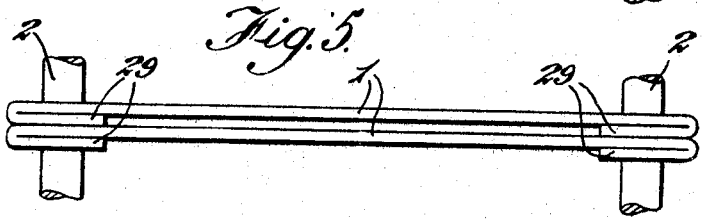
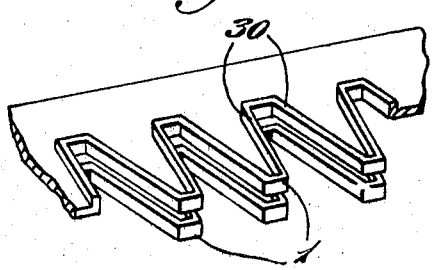
INVENTOR
Ronald John Stevens
Hume Groen Clement + Hume
BY
ATTORNEY INVENTOR
Ronald John Stevens 3,382,982
STRAINERS FOR FLUIDS
Ronald John Stevens, 30 Coombe Lane W.,
Kingston-upon-Thames, England
Filed Feb. 9, 1966, Ser. No. 538,113
3 Claims. (Cl. 210—184)

ABSTRACT OF THE DISCLOSURE

A fluid filter comprising layers of similar plates assembled in the form of a stack, each of the layers comprising a plurality of elongated plates connected together at their ends to define an interior space, the ends of alternate plates being interleaved between the ends of adjoining plates so that the plates of each layer are spaced from those of the intermediate layer, and teeth on one longitudinal edge of each plate which teeth together with the spaces between the plates defining a filtering area which intercept contaminants in a fluid passing between the layers.

---

This invention relates to strainers for fluids, the strainers being of the kind comprising a stack of plates arranged so that filtering openings are provided at or towards their perimeters.

This invention relates to strainers for fluids.

The straining of mass flows of gas or liquid, for example, crude heavy oil or water intake for power stations, requires the removal of the cruder impurities. This is normally effected by screens or woven material, but these materials lack strength, or are so constituted that they clog easily even if the apertures are as coarse as 9 mesh.

An object of this invention is to provide a strong straining element of high efficiency and of a compact nature, the element having a greater straining area than its frontal area, and at the same time providing a relatively large passage through the element.

According to this invention a filter comprises a stack of spaced plates, of metal for example, one peripheral side edge of each plate having teeth, or being otherwise formal, so that the perimeter of the said edge is increased in length, the said edges forming a filtering area which intercepts contaminants in a fluid passing between the plates, and means for supporting the plates in spaced relationship.

In order that the invention may be more clearly understood it will now be described more fully, by way of example, with reference to the accompanying drawings in which:

FIGURE 1 is a perspective view of an assembly of tooth filter plates in accordance with the invention.

FIGURE 4 is an edge elevation of a filter plate showing a modification;

FIGURE 5 is a similar view to that of FIGURE 4 showing another modification, and FIGURE 6 is a fragmentary perspective view of a number of assembled filter plates showing a further modification.

Figure 3:
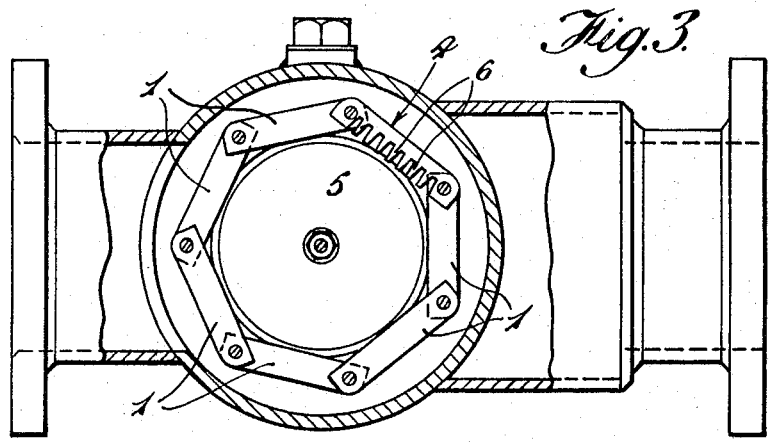
FIGURE 3 is a section on line III—III of FIGURE 2.

Referring to FIGURE 1, any desired number of filter plates 1 are assembled as a stack, the plates being held in alignment by rods 2 which pass through holes 3 in the plates. The assembly of plates may be arranged with other similar assemblies to form a filter unit 4 having central passage 5 of polygonal shape in cross section, for example, as shown in FIGURE 3. It is to be understood however that by selecting the requisite number of assemblies and arranging them accordingly, passages of other geometrical shape may be formed. In one arrangement, for example, the passage may be star shape in cross section. The ends of adjoining plates are interleaved, thus the plates are spaced apart to an extent equal to the thickness of the plates. As the rods 2 pass through the interleaved ends, they serve to retain the plates in their polygonal or other selected arrangement. The plates 1 need not necessarily be rectangular as shown in FIGURE 3, but may be of arcuate shape so that a cylindrical central passage may be formed.

The peripheral edges of the plates towards the central passage may be toothed as indicated at 6 in FIGURE 3. Any desired number of teeth may be provided and each tooth may be proportioned so as to relate to the size of filter mesh required. Preferably, the length of each tooth is greater than three times its width.

In the arrangement shown, the fluid to be filtered passes into the central passage 5 and through the spaces between the plates and it will be apparent that dirt or contaminants in the fluid as indicated at 5A FIGURE 1 will be intercepted at the edges of the teeth. Since teeth provide an increase in the length of edge effective filtering is possible without any appreciable decrease in the cross sectional area of the passage 5. It will be seen that substantially the same effect would be obtained if the edges of the plates were castellated or of sinuous shape.

Figure 2:
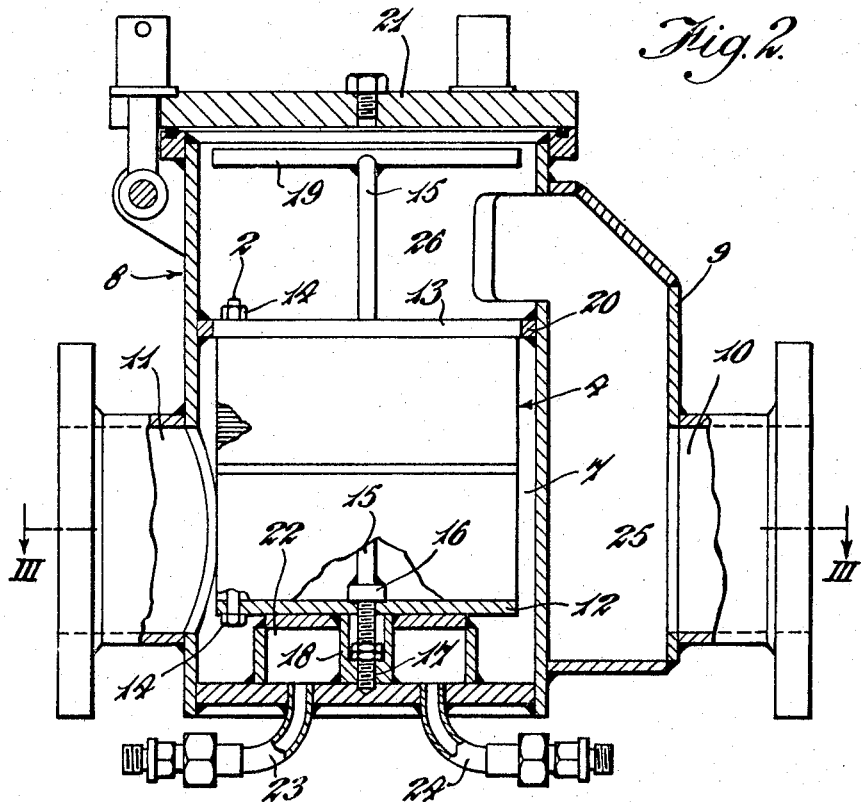
FIGURE 2 is an axial section of a filter incorporating the filter element.

Referring to FIGURES 2 and 3, the filter unit 4 may be fitted within a chamber 7 of a filter housing indicated generally at 8. The filter housing comprises a body 9 having an inlet port 10 for the fluid to be filtered and an outlet port 11 for the filtered fluid. One end of the filter unit 4 is closed by a plate 12 and at the other end is an apertured plate 13. The ends of the rods 2 pass through the plates 12 and 13 and are screw threaded for nuts 14. By tightening the nuts, the plates 1 of the assemblies can be clamped between the plates 12 and 13. Centrally of the filter unit 4 is a rod 15 the lower end of which is screw threaded for connection to the plate 12, the rod having a collar 16 which engages the plate. The lower end of the rod 15 projects downwardly and the extremity of the rod fits freely in a hole 17 provided in an upstanding part 18 of the filter body. The other end of the rod 15 extends upwardly and is fitted with a handle 19. Welded to the wall of the chamber 7 is an annulus 20 which locates the filter unit 4 centrally of the chamber. The body 9 has a removable cover 21 which, when removed, enables the handle to be gripped to effect the withdrawal of the filter unit for cleaning and its subsequent replacement.

The filtration of viscous fluids may be facilitated by heating the fluids. In order to heat such fluids the filter has a steam chamber 22, in juxtaposition to the filter element, to which chamber pipes 23 and 24 are connected, one of the pipes supplying steam to the chamber, and the other serving to exhaust the steam from the chamber.

Fluid to be filtered passes by way of the inlet port 10 into a space 25 and to another space 26 above the filter element and thence through the central passage 5 in the filter unit and to the outlet port 11 via the spaces between the plates. Any particles or other contaminant will be intercepted at the toothed or otherwise formed edges of the plates.

If required, each plate 1 may have a reinforcing rib 27, indicated by dot and dash lines in FIGURE 1.

In the modification, shown in FIGURE 4, each plate has bent up parts 28 adjacent the holes 3. Thus, when the plate is assembled with other similar plates, they are spaced by the parts 28.

In another modification, shown in FIGURE 5, the ends of the plates are bent through 180° as shown at 29 so that when the plates are assembled, filter spaces are provided each having a width equal to the thickness of each plate. By using a suitable tool, the ends of the plates can be bent to any other desired angle thereby enabling a predetermined spacing for the plates.

In a further modified form of filter plate shown in FIGURE 6, the edges of the teeth and the part at the roof thereof are bent up as at 30 to form a lip thus, in a sense forming channels extending for a relatively small part of the width of the plates. Thus, for a small lateral distance corresponding to the thickness of the plates, the passage therethrough will be restricted. In consequence, a piece of contaminant having passed the bent up parts of a tooth cannot be subsequently jammed in the passage between the plates. Thus, a form of "go" or "no go" is given to the contaminant with the result that the filter will be substantially un-cloggable, as well as having enhanced strength.

In the embodiment of the invention described, the flow of the fluid is by way of the central passage 5 but if desired the flow may be in the reverse direction in which instance the toothed or otherwise formed edges of the plates will be arranged exteriorly of the unit. Thus, the fluid will be filtered on entry into the unit.

If desired, the plates 1 may be assembled to provide a flat filter screen and not define a central space as in the construction described. One or more such filters can be arranged in any suitable fluid passage.

Compared with gauze which has many square apertures which can only intercept a piece of contaminant of comparable size, the teeth or otherwise extended length of the filtering edges of the plates provide a filtering area considerably greater than that of the gauze. Thus, if each tooth is considered in conjunction with the vertical distance between it and the next tooth of the adjacent plate as equivalent to any one aperture in a gauze, the total filtering area is much enhanced.

What I claim is:

1. A filter of the kind referred to comprising layers each composed of elongated plates connected together at their ends to define an interior space, the ends of alternate plates being interleaved between the ends of adjoining plates so that the plates of alternate layers are spaced from the plates of the intermediate layers, and teeth at one edge of each plate opposed to the direction of the flow of fluid to be filtered, said teeth on each plate having continuous leading edges of substantially uniform height, said teeth on each plate being in alignment with the teeth on vertically adjacent plates to provide filtering passages between the leading edges of vertically adjacent teeth for intercepting contaminants in said fluid prior to its passage through the spaces between the layers.

2. A filter as set forth in claim 1, including a housing having an inlet port so that the aforesaid fluid can pass to the filter, an outlet port for the discharge of the filtered fluid, and means for heating the fluid during filtration.

3. A filter as set forth in claim 2, wherein the aforesaid housing includes locating means for the filter and wherein the filter has gripping means so that it can be inserted into and removed from the housing.

References Cited

UNITED STATES PATENTS

| | | | |
|---|---|---|---|
| 1,866,970 | 7/1932 | Garland et al. | 210—184 X |
| 2,159,196 | 5/1939 | Babitch | 210—488 |
| 2,547,941 | 4/1951 | Heftler | 210—488 |
| 2,847,126 | 8/1958 | Goodman | 210—488 |
| 3,006,478 | 10/1961 | Mueller | 210—488 X |
| 3,130,042 | 4/1964 | London et al. | 55—278 |

FOREIGN PATENTS

| | | |
|---|---|---|
| 1,163,580 | 4/1958 | France. |
| 573,033 | 3/1933 | Germany. |
| 1,170,374 | 5/1964 | Germany. |

REUBEN FRIEDMAN, *Primary Examiner.*

C. DITLOW, *Assistant Examiner.*

UNITED STATES PATENT OFFICE
CERTIFICATE OF CORRECTION

Patent No. 3,382,982                        May 14, 1968

Ronald John Stevens

It is certified that error appears in the above identified patent and that said Letters Patent are hereby corrected as shown below:

Column 3, line 8, "roof" should read -- root --. Column 4, line 31, "3,130,042" should read -- 3,131,042 --.

Signed and sealed this 14th day of October 1969.

(SEAL)
Attest:

Edward M. Fletcher, Jr.                      WILLIAM E. SCHUYLER, JR.
Attesting Officer                              Commissioner of Patents